US007779454B2

(12) United States Patent
Challener et al.

(10) Patent No.: US 7,779,454 B2
(45) Date of Patent: Aug. 17, 2010

(54) SYSTEM AND METHOD FOR VIRTUALIZED HYPERVISOR TO DETECT INSERTION OF REMOVABLE MEDIA

(75) Inventors: David Carroll Challener, Raleigh, NC (US); Daryl Cromer, Cary, NC (US); Howard Jeffrey Locker, Cary, NC (US); Randall Scott Springfield, Chapel Hill, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 931 days.

(21) Appl. No.: 11/564,832

(22) Filed: Nov. 29, 2006

(65) Prior Publication Data

US 2008/0127309 A1 May 29, 2008

(51) Int. Cl.
*G06F 21/20* (2006.01)
(52) U.S. Cl. .............................. 726/4; 726/21; 726/22; 726/23; 726/24; 726/26; 713/150; 713/168; 713/189
(58) Field of Classification Search .................. 705/50, 705/60–66
See application file for complete search history.

(56) References Cited

U.S. PATENT DOCUMENTS 5,638,484 A * 6/1997 Yun ............................ 386/79
5,960,170 A * 9/1999 Chen et al. .................... 714/38
6,218,941 B1 * 4/2001 Cromer et al. ............ 340/572.1
6,473,800 B1 * 10/2002 Jerger et al. ................. 709/226
2008/0046753 A1 * 2/2008 Fusari ......................... 713/186

* cited by examiner

*Primary Examiner*—Taghi T Arani
*Assistant Examiner*—Amir Mehrmanesh
(74) *Attorney, Agent, or Firm*—VanLeeuwen & VanLeeuwen; Carlos Munoz-Bustamante

(57) ABSTRACT

A system and method for using a client-side hypervisor in conjunction with a secure network-side monitoring mechanism to detect removable media insertions since a client's last network session with the secure network is presented. The hypervisor uses a "client-side insertion value" to track the number of times that a user inserts removable media into a socket located on the client. When the client is connected to the secure network, the client's hypervisor notifies the secure network of each insertion and the secure network increments a "secure network-side tracker value." For each login request, the client includes the client-side insertion value, which the secure network compares against its secure network-side tracker value. When the two values are different, the secure network sends an action request to the client, such as a request to perform a full system scan. Once the client performs the action, the client's hypervisor resets its client-side insertion value and attempts to logon to the secure network again.

17 Claims, 5 Drawing Sheets

SYSTEM AND METHOD FOR VIRTUALIZED HYPERVISOR TO DETECT INSERTION OF REMOVABLE MEDIA

BACKGROUND OF THE INVENTION

1. Technical Field

The present invention relates to a system and method for a virtualized hypervisor to detect insertion of removable media. More particularly, the present invention relates to a system and method for using a client-side hypervisor in conjunction with a secure network-side monitoring mechanism to detect removable media insertions since a client's last secure network session.

2. Description of the Related Art

Mobile clients, such as laptop computers, have grown in popularity due to a growing demand from users requiring portability. Even though a user may operate a mobile client disconnected from a corporate network, the user frequently requires connectivity to the corporate network, usually over a secure network connection. As such, the user's mobile client is intermittently connected to the corporate network.

This intermittent connectivity presents problems for corporations attempting to ensure that mobile clients are free from security threats because the corporations are not able to track client activities when the clients are disconnected from the corporate network. One of these activities that pose a security threat is when a user inserts removable media into the client device in order to install unapproved software or files. The unapproved software or files may include virus that may ultimately enter into the corporate network the next time the mobile client logs onto the corporate network. Removable media may include, for example, a compact disc (CD), a digital video disc (DVD), a USB drive, a USB Memory Key, or a 1394 Drive.

One approach to ensure that a mobile client is free from security threats is to perform a full system scan each time the mobile client logs onto the corporate network. A challenge found, however, is that a user may not insert removable media into the mobile client device between network sessions and, as a result, unnecessary system scans are performed on the mobile client, which wastes time, consumes processing power, and consumes network bandwidth.

What is needed, therefore, is a system and method to identify removable media insertions at a mobile client between secure network connections and perform appropriate actions.

SUMMARY

It has been discovered that the aforementioned challenges are resolved using a system and method for using a client-side hypervisor in conjunction with a secure network-side monitoring mechanism to detect removable media insertions since a client's last network session with the secure network. The hypervisor uses a "client-side insertion value" to track the number of times that a user inserts removable media into a socket located on the client. When the client is connected to the secure network, the client hypervisor notifies the secure network of each insertion and the secure network increments a "secure network-side tracker value." For each login request, the client hypervisor includes the client-side insertion value, which the secure network compares against its secure network-side tracker value. When the two values are different, the secure network sends an action request to the client hypervisor, such as a request to perform a full system scan. Once the client (or client hypervisor) performs the action, the client resets its client-side insertion value and attempts to logon to the secure network again.

A client hypervisor initializes and loads the client-side insertion value with an initial value. For example, the initial value may be zero, or may be a hash of a counter with a hard file serial number or other known secure methods. When a user wishes to connect the client to the secure network, the client hypervisor sends a login request to the secure network that includes the client-side insertion value.

The secure network detects that the login request includes an initial value, and stores the initial value as a secure network-side tracker value in a secure network-side storage area. In turn, the secure network sends an authorization to the client, which authorizes the client to communicate to the secure network over a secure network connection.

When the user inserts removable media into the client's socket, the client hypervisor detects the insertion since I/O requests to/from the operating system go through the client's hypervisor. In turn, the client hypervisor increments the client-side insertion value, thus tracking times at which the removable media is inserted into the socket. In addition, when the client is connected to the secure network, the client hypervisor sends an increment request to the secure network, which informs the secure network of the removable media's insertion. As a result, the secure network increments the secure network-side tracker value that is stored in the secure network-side storage area. As long as the client is connected to the secure network, the secure network-side tracker value increments at the same rate as the client-side insertion value increments.

When the client disconnects from the secure network, the client hypervisor still sends insertion notifications to the secure network when the user inserts the removable media into the client's socket, but the secure network never receives the notification since the client is not connected to the secure network. As a result, the client-side insertion value increments without the secure network-side tracker value incrementing at the secure network. In one embodiment, a user may prevent the operating system from sending insertion notifications to the hypervisor by providing information, such as a password.

When the user wishes to reconnect the client to the secure network, the client hypervisor sends another login request that includes the current value of the client-side insertion value. The secure network extracts the client-side insertion value from the login request, and compares it to the secure network-side tracker value stored in the secure network-side storage area. The two values will be equal when the user has not inserted removable media into the client's socket while the client has been disconnected from the secure network. In this case, the secure network authorizes the client to communicate over a secure network connection.

However, when the user inserts removable media into the client's socket while the client is disconnected from the secure network, the client-side insertion value will be different than the secure network-side tracker value. When this occurs, the secure network sends an action request to the client hypervisor that instructs the client to perform a particular action, such as performing a full system scan to check for viruses. Once the client successfully performs the action, the client hypervisor resets the client-side insertion value and attempts to login to the secure network. The secure network validates a successful action and then resets the secure network-side tracker value to be equal to the client-side insertion value.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

DETAILED DESCRIPTION

The following is intended to provide a detailed description of an example of the invention and should not be taken to be limiting of the invention itself. Rather, any number of variations may fall within the scope of the invention, which is defined in the claims following the description.

Figure 1:
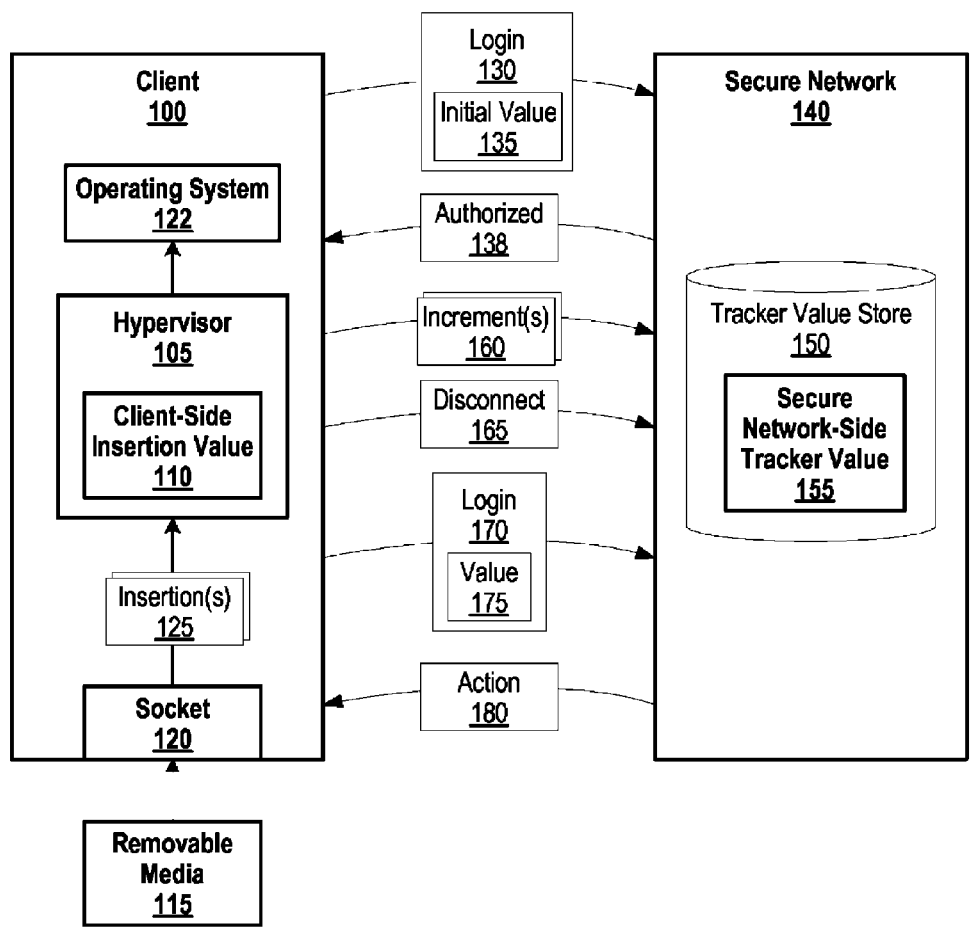
FIG. 1 is a diagram showing a client and a secure network tracking removable media insertions at the client.

FIG. 1 is a diagram showing a client and a secure network tracking removable media insertions at the client. Client 100 may be a mobile device, such as a notebook computer, in which a user connects to secure network 140 through a secure network connection. Client 100 includes hypervisor 105, which uses client-side insertion value 110 to track the number of times that a user inserts removable media 115 into socket 120. When client 100 is connected to secure network 140, hypervisor 105 sends increments 160 to secure network 140 in order for secure network 140 to jointly track the number of times that removable media 115 is inserted into socket 120 (e.g., secure network-side tracker value 155). As one skilled in the art can appreciate, hypervisor 105 is virtualized and, as such, is independent from hardware changes to client 100.

Hypervisor 105 initializes and loads client-side insertion value 110 with an initial value. For example, the initial value may be zero, or may be a hash of a counter with a hard file serial number. When a user wishes to connect client 100 to secure network 140, client hypervisor 105 sends login 130 to secure network 140. Login 130 includes initial value 135, which is the same initial value that is stored in client-side insertion value 110.

Secure network 140 detects that login 130 includes an initial value (initial value 135) and stores it as secure network-side tracker value 155 located in tracker value store 150. For example, secure network 140 may include a table entry for each client, and if no table entry exists for a particular client, secure network 140 determines that the value in login 130 is an initial value. Secure network 140 sends authorized 138 to client 100, which authorizes client 100 to communicate to secure network 140 over a secure network connection. Tracker value store 150 may be securely stored using known techniques on a nonvolatile storage area, such as a computer hard drive, system FLASH, etc.

When a user inserts removable media 115 into socket 120, insertion 125 passes through hypervisor 125 to operating system 122. As such, hypervisor 105 increments client-side insertion value 110, thus tracking the number of times that removable media 115 is inserted into socket 120. In one embodiment, hypervisor 105 increments client side insertion value 110 in a pseudo-random manner such that a user is unable to predict upcoming values of client-side insertion value 110. Hypervisor 105 also sends increment(s) 160 to secure network 140, which informs secure network 140 of removable media 115's insertion. As a result, secure network 140 increments secure network-side tracker value 155. As long as client 100 is connected to secure network 140, secure network-side tracker value 155 increments at the same rate as client-side insertion value 110 increments.

When client 100 disconnects from secure network 140 (disconnect 165), hypervisor 105 still increments client-side insertion value 110 when the user inserts removable media 115 into socket 120, but increments 160 do not reach secure network 140. As a result, client-side insertion value 110 increments without secure network-side tracker value 155 incrementing. In one embodiment, a user may prevent hypervisor 105 from incrementing client-side insertion value 110 by providing information, such as a password (see FIG. 3 and corresponding text for further details).

When the user wishes to reconnect client 100 to secure network 140, hypervisor 105 sends login 170 that includes the current value of client-side insertion value 110 (value 175). Secure network 140 extracts value 175 from login 170, and compares value 175 to secure network-side tracker value 155 stored in insertion tracker store 150. The two values will be equal when the user has not inserted removable media 115 into socket 120 while client 100 has been disconnected from secure network 140. In this case, secure network 140 authorizes client 100 to communicate over a secure network connection.

However, when the user inserts removable media 115 into socket 120 while client 100 is disconnected from secure network 140, value 175 will be different than secure network-side tracker value 155. When this occurs, secure network 140 sends action 180 to client 100 that instructs client 100 to perform a particular action, such as performing a full system scan to check for viruses. Once client 100 performs action 180, hypervisor 105 resets client-side insertion value 110 and is able to login to secure network 140.

Figure 2:
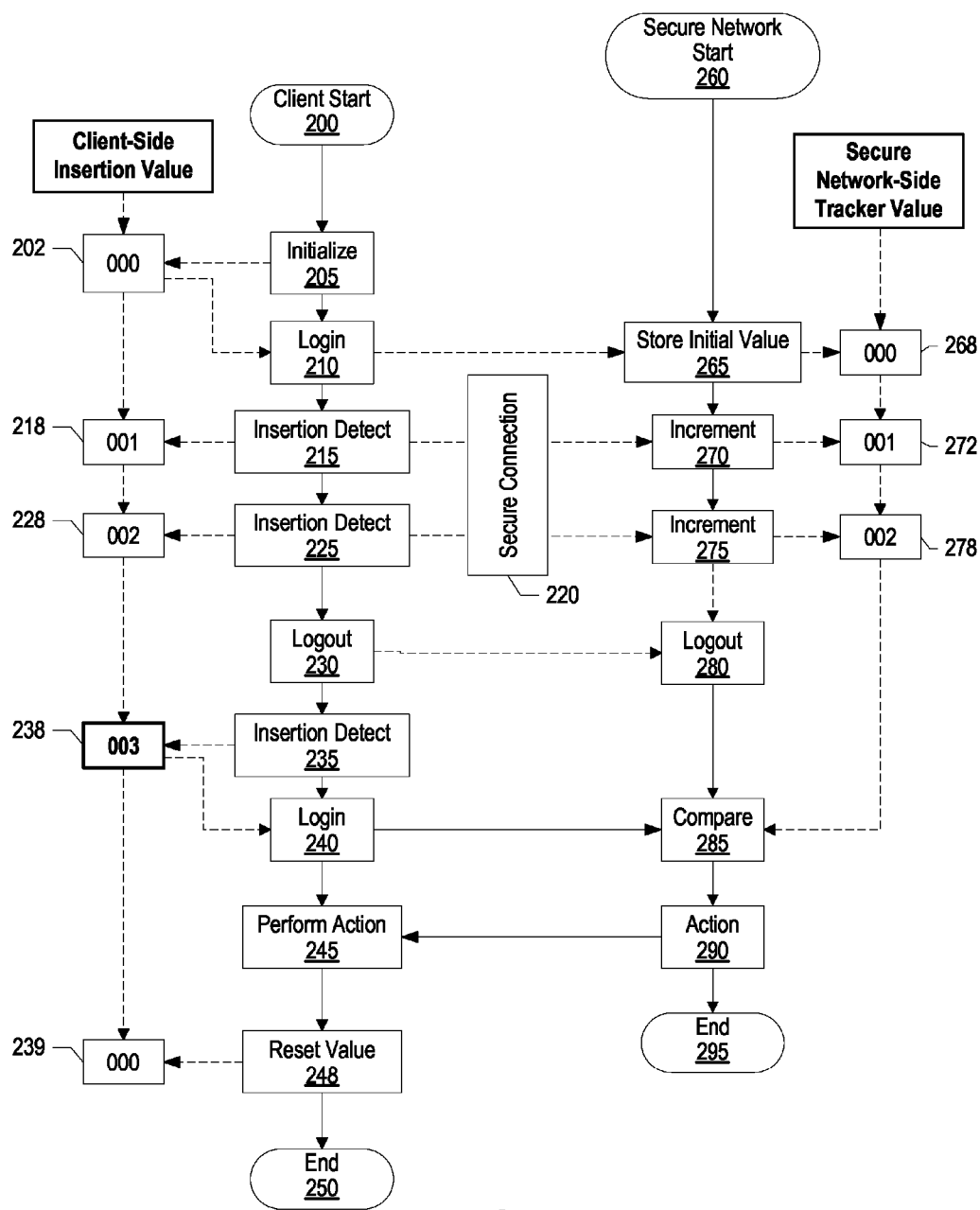
FIG. 2 is a diagram showing a client incrementing a client-side insertion value and a secure network incrementing a secure network-side tracker value based upon a user inserting removable media into the client.

FIG. 2 is a diagram showing a client incrementing a client-side insertion value and a secure network incrementing a secure network-side tracker value based upon a user inserting removable media into the client. Client processing commences at 200, whereupon the client initializes at step 205. During initialization, the client's hypervisor sets a client-side insertion value to an initial value, such as "000" (box 202). The client sends a login request to the secure network at step 210 and provides the client-side insertion value (box 202) to the secure network.

Secure network processing commences at 260, whereupon the secure network stores the received initial value (step 265) as a secure network-side tracker value (box 268). The secure network authorizes the client and establishes secure connection 220 between the client and the secure network. Once connected, the client's hypervisor detects a removable media insertion at step 215, at which point the client's hypervisor increments the client-side insertion value (box 218) and also sends an increment request to the secure network to increment the secure network-side tracker value, which the secure network executes at step 270 (box 272). The client's hypervisor detects another removable media insertion at step 225 and increments the client-side insertion value (box 228) along with sending another increment request to the secure network to increment the secure network-side tracker value, which the secure network executes at step 275 (box 278).

At step 230, the client logs off secure connection 220 with the secure network (step 280). While logged off, the client's hypervisor detects another removable media insertion at step 235 and, in turn, increments the client-side insertion value (box 238). The client's hypervisor attempts to send an increment request but, since the client is not logged onto the secure network, the secure network does not receive the increment request. As a result, the client-side insertion value (box 238) is different than the secure network-side tracker value (box 278).

The client attempts to reconnect to the secure network by sending a login request to the secure network at step 240. The login request includes the current client-side insertion value (box 238). The secure network compares the current client-side insertion value with the current secure network-side tracker value (box 278). Since these values are different, the secure network determines that the user inserted removable media into the client while the client was disconnected from the secure network. As such, the secure network sends an action request at step 290 for the client to perform (e.g., full system scan). Secure network processing ends at 295 (see FIG. 4 and corresponding text for further details).

The client receives the action request and performs the action at step 245. At step 248, the client resets the client-side insertion value (box 239) and ends at 250 (see FIG. 3 and corresponding text for further details).

Figure 3:
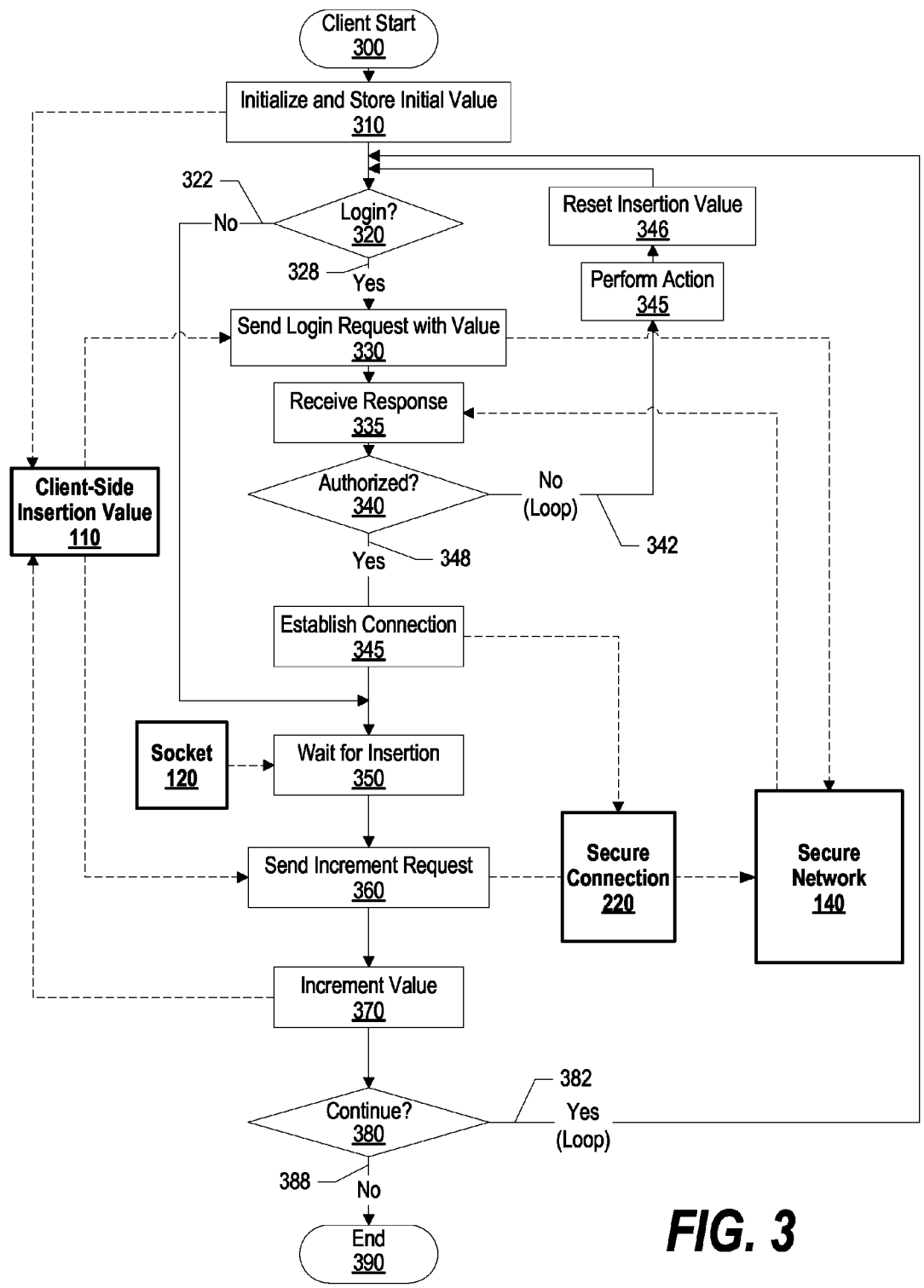
FIG. 3 is a flowchart showing steps taken in a client's hypervisor tracking removable media insertions and informing a secure network when connected to the secure network.

FIG. 3 is a flowchart showing steps taken in a client's hypervisor tracking removable media insertions and informing a secure network when connected to the secure network. Client processing commences at 300, whereupon the client's hypervisor initializes and stores an initial value in client-side insertion value 110, such as a hash value or a value of zero (step 310). Client-side insertion value 110 is the same as that shown in FIG. 1.

A determination is made as to whether a user wishes to log on to secure network 140 (decision 320). If the user does not wish to log on to secure network 140, decision 320 branches to "No" branch 322 bypassing login steps. On the other hand, if the user wishes to log on to secure network 140, decision 320 branches to "Yes" branch 328 whereupon the client sends a login request, which includes client-side insertion value 110, to secure network 140 (step 330). Secure network 140 is the same as that shown in FIG. 1.

Secure network 140 receives the login request and performs a particular action depending upon whether client-side insertion value 110 is an initial value. When client-side insertion value 110 is an initial value, secure network 140 stores it as a secure network-side tracker value. When client-side insertion value is not an initial value, secure network 140 compares client-side insertion value 110 with a secure network-side tracker value (see FIG. 4 and corresponding text for further details).

Processing receives a response from secure network 140 (step 335) that includes either a network session authorization or an action request for the client to perform. A determination is made as to whether secure network 140 authorized a network session with the client (decision 340). If secure network 140 did not authorize a network session, decision 340 branches to "No" branch 342 which loops back to perform the action that was included in secure network 140's response (step 345), and resets client-side insertion value 110 at step 346. This looping continues until secure network 140 authorizes the client, at which point decision 340 branches to "Yes" branch 348 whereupon the client and secure network 140 establish secure connection 220. Secure connection 220 is the same as that shown in FIG. 2.

At step 349, the client's hypervisor waits for a user to insert removable media into socket 120, which is the same as that shown in FIG. 1. Once the client's hypervisor detects an insertion, the client's hypervisor sends an increment request to secure network at step 360. When secure connection 220 is established through proper authorization steps discussed above, secure network 140 receives the increment request and increments its secure network-side tracker value. When secure connection 220 has not been established, secure network 140 does not receive the increment request and, therefore, never increments its secure network-side tracker value.

At step 370, the client's hypervisor increments client-side insertion value 110, thus tracking the number if times that the client's user inserted removable media into socket 120. In one embodiment, a user may prevent the operating system from sending insertion notifications to the hypervisor by providing information, such as a password.

A determination is made as to whether to continue processing (decision 380). If processing should continue, decision 380 branches to "Yes" branch 382 to continue monitoring removable media insertions. This looping continues until processing should terminate, at which point decision 380 branches to "No" branch 388 whereupon processing ends at 390.

Figure 4:
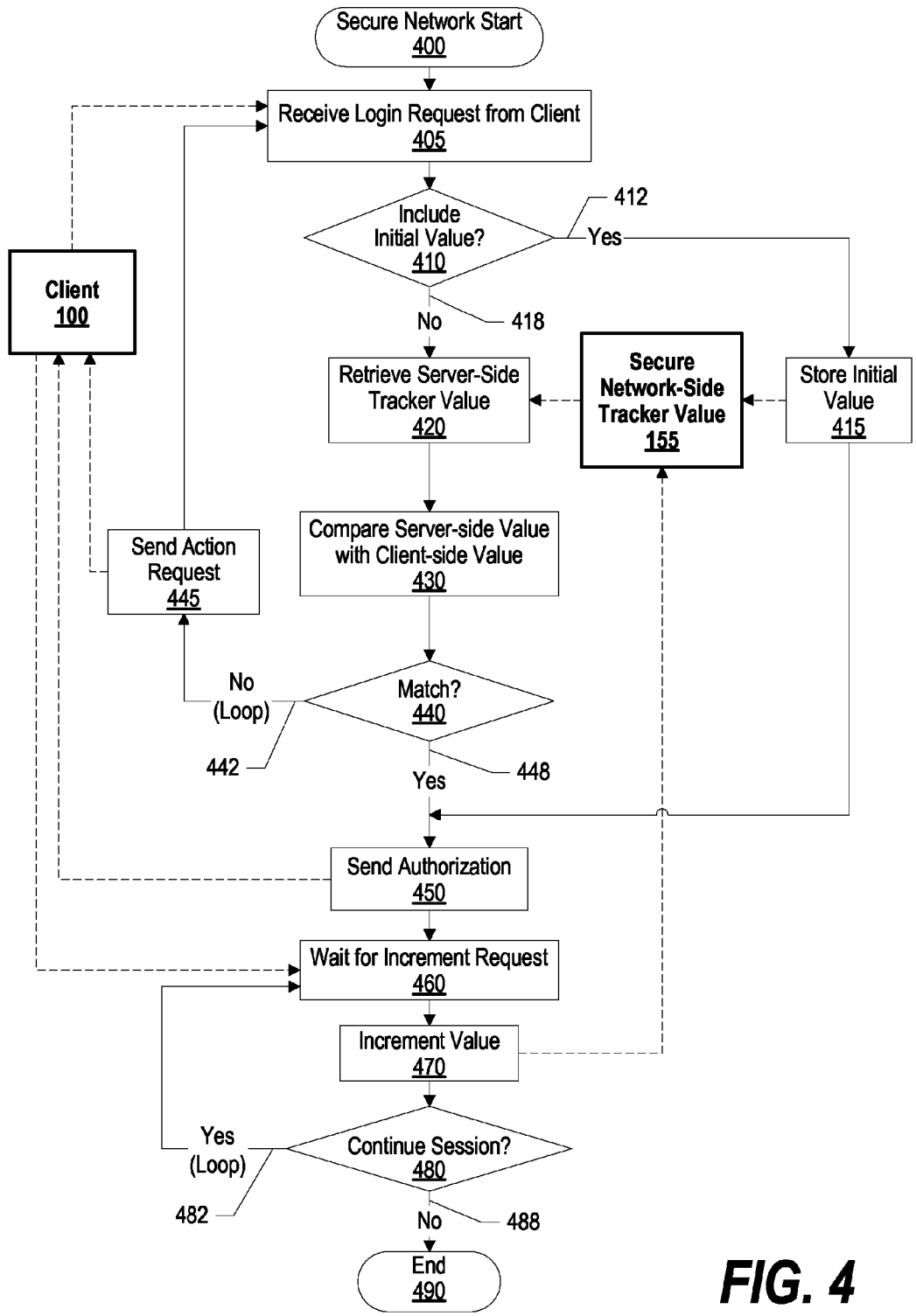
FIG. 4 is a flowchart showing steps taken in a secure network receiving login requests from a client and tracking removable media insertions performed at the client.

FIG. 4 is a flowchart showing steps taken in a secure network receiving login requests from a client and tracking removable media insertions performed at the client. Secure network processing commences at 400, whereupon processing receives a login request from client 100 at step 405. The login request includes a client-side insertion value that corresponds to a number of times that a removable media device is inserted into client 100. Client 100 is the same as that shown in FIG. 1.

A determination is made as to whether the client-side insertion value is an initial value (decision 410). The client-side insertion value is an initial value when client 100 first initializes and has not yet detected removable media insertions. For example, processing may use a table entry for each client, and if no table entry exists for client 100, processing determines that the client-side insertion value is an initial value. The client-side insertion value may also be reset to an initial value after client 100 has performed an action, such as a full system scan (see FIG. 3 and corresponding text for further details).

If the client-side insertion value is an initial value, decision 410 branches to "Yes" branch 412 whereupon processing stores the initial value as secure network-side tracker value 155 (step 415). Secure network-side tracker value 155 is the same as that shown in FIG. 1.

On the other hand, if the client-side insertion value is not an initial value, decision 410 branches to "No" branch 418 whereupon processing retrieves secure network-side tracker value 155 at step 420. For example, client 100 may have previously detected removable media insertions and incremented the client-side insertion value accordingly.

At step 430, processing compares the client-side insertion value with secure network-side tracker value 155. A determination is made as to whether the two values match (decision 440). If the two values do not match, indicating that a user inserted removable media into client 100 while client 100 was disconnected from the secure network, decision 440 braches to "No" branch 442 which loops back to send an action request to client 100 at step 445. For example, the action request may be a request for client 100 to perform a full system scan to check for viruses. The secure network loops back to receive another login request from client 100 once client 100 performs the requested action. This looping continues until secure network-side tracker value 155 matches the received client-side insertion value, at which point decision 440 branches to "Yes" branch 448.

At step 450, processing sends an authorization to client 100, which authorizes client 100 to connect to the secure network over a secure connection. Once connected, the secure network waits for increment requests from client 100 (step 460). When the secure network receives an increment request, the secure network secure network-side tracker value 155.

A determination is made as to whether to continue the network session with client 100 (decision 480). If the secure network should continue the network session, decision 480 branches to "Yes" branch 482 which loops back to wait for more increment requests. This looping continues until the session should terminate, at which point decision 480 branches to "No" branch 488 whereupon secure network processing ends at 490.

Figure 5:
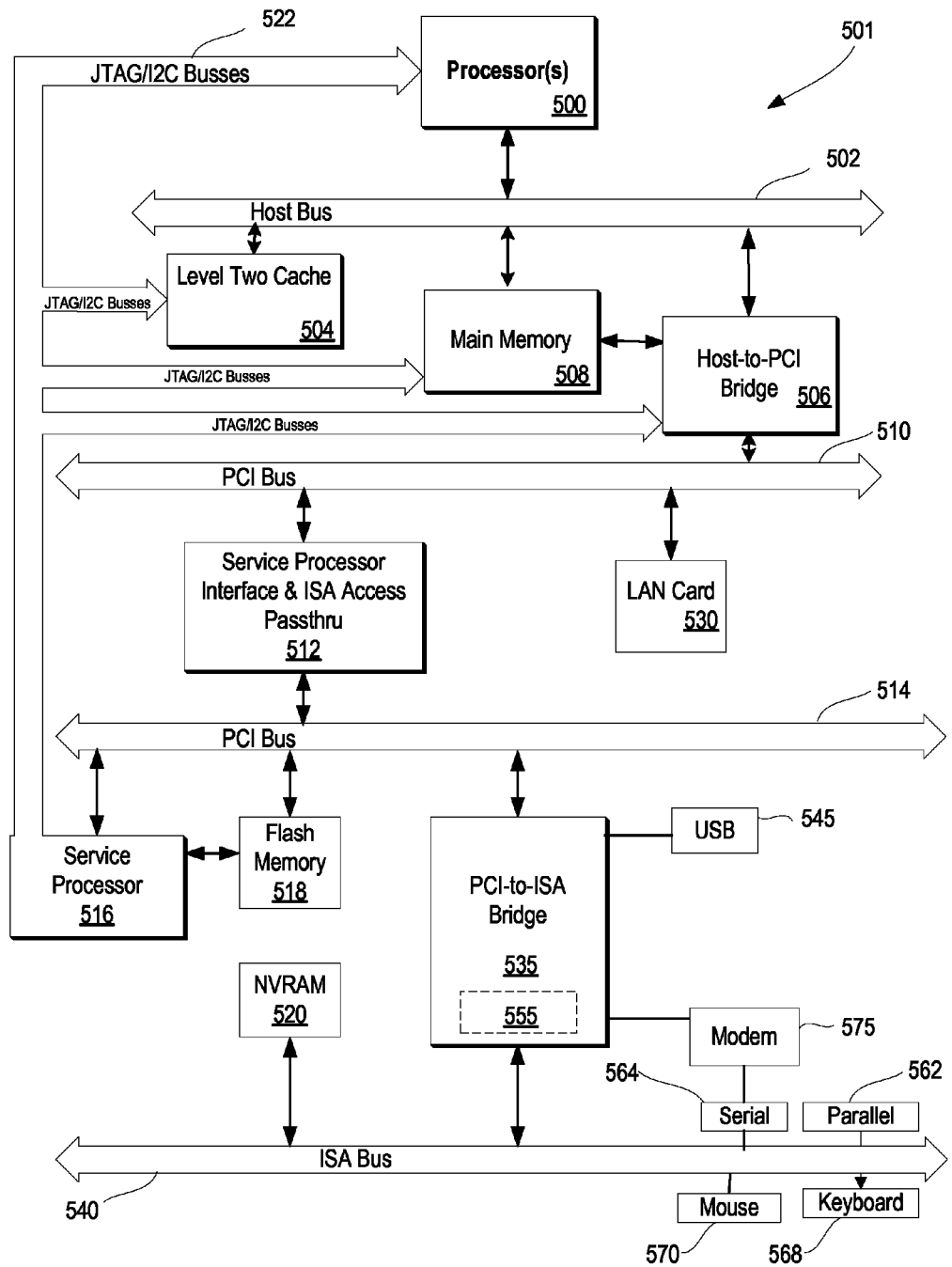
FIG. 5 is a block diagram of a computing device capable of implementing the present invention.

FIG. 5 illustrates information handling system 501 which is a simplified example of a computer system capable of performing the computing operations described herein. Information handling system 501 includes processor 500 which is coupled to host bus 502. A level two (L2) cache memory 504 is also coupled to host bus 502. Host-to-PCI bridge 506 is coupled to main memory 508, includes cache memory and main memory control functions, and provides bus control to handle transfers among PCI bus 510, processor 500, L2 cache 504, main memory 508, and host bus 502. Main memory 508 is coupled to Host-to-PCI bridge 506 as well as host bus 502. Devices used solely by host processor(s) 500, such as LAN card 530, are coupled to PCI bus 510. Service Processor Interface and ISA Access Pass-through 512 provides an interface between PCI bus 510 and PCI bus 514. In this manner, PCI bus 514 is insulated from PCI bus 510. Devices, such as flash memory 518, are coupled to PCI bus 514. In one implementation, flash memory 518 includes BIOS code that incorporates the necessary processor executable code for a variety of low-level system functions and system boot functions.

PCI bus 514 provides an interface for a variety of devices that are shared by host processor(s) 500 and Service Processor 516 including, for example, flash memory 518. PCI-to-ISA bridge 535 provides bus control to handle transfers between PCI bus 514 and ISA bus 540, universal serial bus (USB) functionality 545, power management functionality 555, and can include other functional elements not shown, such as a real-time clock (RTC), DMA control, interrupt support, and system management bus support. Nonvolatile RAM 520 is attached to ISA Bus 540. Service Processor 516 includes JTAG and I2C busses 522 for communication with processor(s) 500 during initialization steps. JTAG/I2C busses 522 are also coupled to L2 cache 504, Host-to-PCI bridge 506, and main memory 508 providing a communications path between the processor, the Service Processor, the L2 cache, the Host-to-PCI bridge, and the main memory. Service Processor 516 also has access to system power resources for powering down information handling device 501.

Peripheral devices and input/output (I/O) devices can be attached to various interfaces (e.g., parallel interface 562, serial interface 564, keyboard interface 568, and mouse interface 570 coupled to ISA bus 540. Alternatively, many I/O devices can be accommodated by a super I/O controller (not shown) attached to ISA bus 540.

In order to attach computer system 501 to another computer system to copy files over a network, LAN card 530 is coupled to PCI bus 510. Similarly, to connect computer system 501 to an ISP to connect to the Internet using a telephone line connection, modem 555 is connected to serial port 564 and PCI-to-ISA Bridge 535.

While FIG. 5 shows one information handling system that employs processor(s) 500, the information handling system may take many forms. For example, information handling system 501 may take the form of a desktop, secure network, portable, laptop, notebook, or other form factor computer or data processing system. Information handling system 501 may also take other form factors such as a personal digital assistant (PDA), a gaming device, ATM machine, a portable telephone device, a communication device or other devices that include a processor and memory.

One of the preferred implementations of the invention is a client application, namely, a set of instructions (program code) in a code module that may, for example, be resident in the random access memory of the computer. Until required by the computer, the set of instructions is securely stored using known techniques so a user can't disable this function in the system hard disk drive. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A machine-implemented method comprising:
   detecting an initialization request at a client;
   in response to detecting the initialization request, storing an initial value as a client-side insertion value, the client-side insertion value being used to track a number of removable media insertions at the client;
   sending a first login request to a secure network that includes the initial value, wherein the secure network is adapted to store the initial value as a secure network-side tracker value that tracks, at the secure network, the number of removable media insertions at the client;
detecting a first removable media insertion by a user at the client while the client is logged into the secure network;
in response to detecting the first removable media insertion:
incrementing the client-side insertion value; and
sending an increment request to the secure network, wherein the secure network is adapted to increment the secure network-side tracker value in response to receiving the increment request;
in response to sending the increment request, logging off the secure network by the client;
in response to the logging off of the secure network, detecting a second removable media insertion at the client;
in response to detecting the second removable media insertion, re-incrementing the incremented client-side insertion value at the client;
sending a second login request to the secure network, the second login request including the re-incremented client-side insertion value;
receiving a message from the secure network that includes an action in response to the secure network determining that the re-incremented client-side insertion value does not equal the incremented secure network-side tracker value;
performing the action at the client in response to receiving the message; and
resetting the client-side insertion value.

2. The method of claim 1 wherein a hypervisor located on the client performs the detecting and the incrementing, the hypervisor being used to prevent the user from modifying the client-side insertion value.

3. The method of claim 1 further comprising:
sending a third login request to the secure network that includes the reset client-side insertion value, the secure network adapted to store the reset client-side insertion value as the secure network-side tracker value;
receiving, at the client, a login authorization from the secure network in response to sending the reset client-side insertion value;
in response to the login authorization, detecting a third removable media insertion at the client;
incrementing the reset client-side insertion value in response to detecting the third removable media insertion;
sending a subsequent increment request to the secure network in response to detecting the third removable media insertion; and
incrementing, at the secure network, the secure network-side tracker value in response to receiving the subsequent increment request.

4. The method of claim 3 further comprising:
sending a fourth login request to the secure network that includes the incremented reset client-side insertion value; and
receiving, at the client, a subsequent login authorization from the secure network indicating that the secure network determined that the incremented reset client-side insertion value matched the secure network-side tracker value.

5. The method of claim 1 further comprising:
detecting a third removable media insertion by the user at the client;
determining that the user is authorized to perform the third removable media insertion; and
in response to determining that the user is authorized to perform the third removable media insertion, preventing the incrementing of the client-side insertion value.

6. The method of claim 1 wherein the action is selected from the group consisting of a virus scan and an installed software inventory.

7. A computer program product stored on a non-transitory computer storage medium, the computer operable media containing instructions for execution by a computer, which, when executed by the computer, cause the computer to implement a method to track removable media insertions at a client, the method comprising:
detecting an initialization request at a client;
in response to detecting the initialization request, storing an initial value as a client-side insertion value, the client-side insertion value being used to track a number of removable media insertions at the client;
sending a first login request to a secure network that includes the initial value, wherein the secure network is adapted to store the initial value as a secure network-side tracker value that tracks, at the secure network, the number of removable media insertions at the client;
detecting a first removable media insertion by a user at the client while the client is logged into the secure network;
in response to detecting the first removable media insertion:
incrementing the client-side insertion value; and
sending an increment request to the secure network, wherein the secure network is adapted to increment the secure network-side tracker value in response to receiving the increment request;
in response to sending the increment request, logging off the secure network by the client;
in response to the logging off of the secure network, detecting a second removable media insertion at the client;
in response to detecting the second removable media insertion, re-incrementing the incremented client-side insertion value at the client;
sending a second login request to the secure network, the second login request including the re-incremented client-side insertion value;
receiving a message from the secure network that includes an action in response to the secure network determining that the re-incremented client-side insertion value does not equal the incremented secure network-side tracker value;
performing the action at the client in response to receiving the message; and resetting the client-side insertion value.

8. The computer program product of claim 7 wherein a hypervisor located on the client performs the detecting and the incrementing, the hypervisor being used to prevent the user from modifying the client-side insertion value.

9. The computer program product of claim 7 wherein the method further comprises:
sending a third login request to the secure network that includes the reset client-side insertion value, the secure network adapted to store the reset client-side insertion value as the secure network-side tracker value;
receiving, at the client, a login authorization from the secure network in response to sending the reset client-side insertion value;
in response to the login authorization, detecting a third removable media insertion at the client;
incrementing the reset client-side insertion value in response to detecting the third removable media insertion;

sending a subsequent increment request to the secure network in response to detecting the third removable media insertion; and incrementing, at the secure network, the secure network-side tracker value in response to receiving the subsequent increment request.

10. The computer program product of claim 9 wherein the method further comprises:

sending a fourth login request to the secure network that includes the incremented reset client-side insertion value; and receiving, at the client, a subsequent login authorization from the secure network indicating that the secure network determined that the incremented reset client-side insertion value matched the secure network-side tracker value.

11. The computer program product of claim 7 wherein the method further comprises:

detecting a third removable media insertion by the user at the client;

determining that the user is authorized to perform the third removable media insertion; and in response to determining that the user is authorized to perform the third removable media insertion, preventing the incrementing of the client-side insertion value.

12. The computer program product of claim 7 wherein the action is selected from the group consisting of a virus scan and an installed software inventory.

13. An information handling system comprising:

one or more processors;

a memory accessible by the processors;

one or more nonvolatile storage devices accessible by the processors; and a set of instructions stored in the memory, wherein one or more of the processors executes the set of instructions in order to perform actions of:

detecting an initialization request;

in response to detecting the initialization request, storing an initial value as a client-side insertion value in the memory, the client-side insertion value being used to track a number of removable media insertions;

sending a first login request to a secure network that includes the initial value, wherein the secure network is adapted to store the initial value as a secure network-side tracker value that tracks, at the secure network, the number of removable media insertions;

detecting a first removable media insertion by a user while the information handling system is logged into the secure network;

in response to detecting the first removable media insertion:

incrementing the client-side insertion value; and sending an increment request to the secure network, wherein the secure network is adapted to increment the secure network-side tracker value in response to receiving the increment request;

in response to sending the increment request, logging off the secure network;

in response to the logging off of the secure network, detecting a second removable media insertion at the client;

in response to detecting the second removable media insertion, re-incrementing the incremented client-side insertion value;

sending a second login request to the secure network, the second login request including the re-incremented client-side insertion value;

receiving a message from the secure network that includes an action in response to the secure network determining that the re-incremented client-side insertion value does not equal the incremented secure network-side tracker value;

performing the action in response to receiving the message; and resetting the client-side insertion value.

14. The information handling system of claim 13 wherein a hypervisor performs the detecting and the incrementing, the hypervisor being used to prevent the user from modifying the client-side insertion value stored in one of the nonvolatile storage devices.

15. The information handling system of claim 13 further comprising an additional set of instructions in order to perform actions of:

in response to the login request, sending a third login request to the secure network that includes the reset client-side insertion value, the secure network adapted to store the reset client-side insertion value as the secure network-side tracker value;

receiving, at the client, a login authorization from the secure network in response to sending the reset client-side insertion value;

in response to the login authorization, detecting a third removable media insertion;

incrementing the reset client-side insertion value in response to detecting the third removable media insertion;

sending a subsequent increment request to the secure network in response to detecting the third removable media insertion; and incrementing, at the secure network, the secure network-side tracker value in response to receiving the subsequent increment request.

16. The information handling system of claim 15 further comprising an additional set of instructions in order to perform actions of:

sending a fourth login request to the secure network that includes the incremented reset client-side insertion value; and receiving, at the client, a subsequent login authorization from the secure network indicating that the secure network determined that the incremented reset client-side insertion value matched the secure network-side tracker value.

17. The information handling system of claim 13 further comprising an additional set of instructions in order to perform actions of:

detecting a third removable media insertion by the user;

determining that the user is authorized to perform the third removable media insertion; and in response to determining that the user is authorized to perform the third removable media insertion, preventing the incrementing of the client-side insertion value.

* * * * *